W. GARDINER & J. STIRLEN.
STORAGE BATTERY.
APPLICATION FILED FEB. 11, 1909.
926,649.
Patented June 29, 1909.
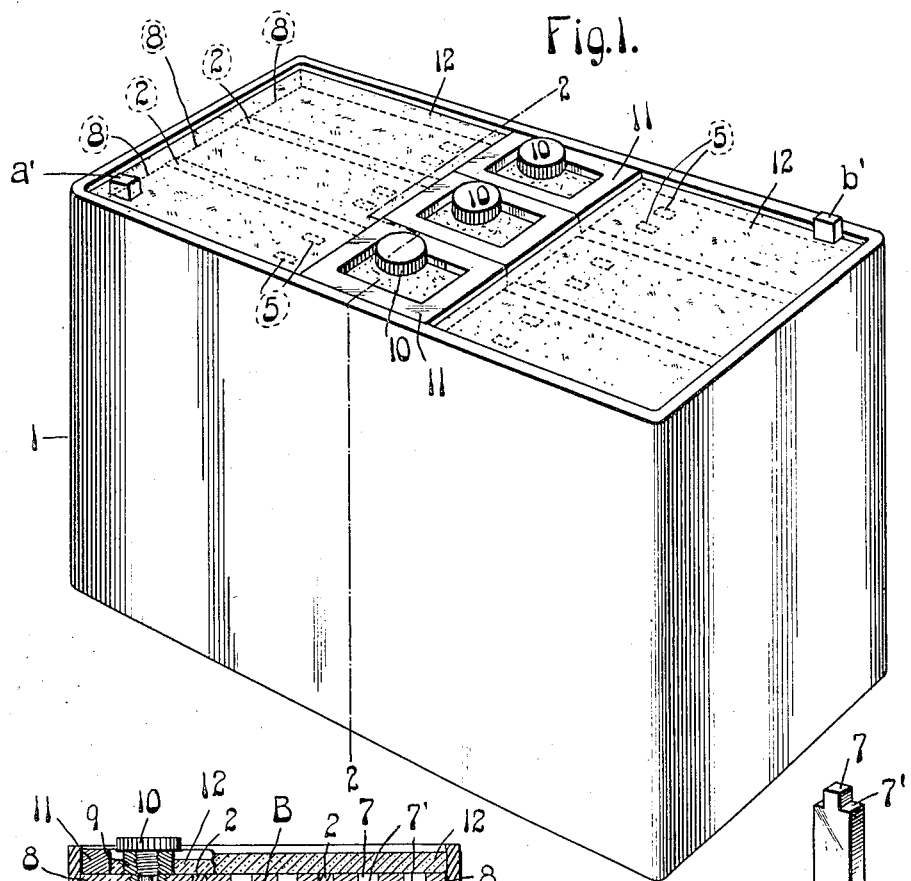
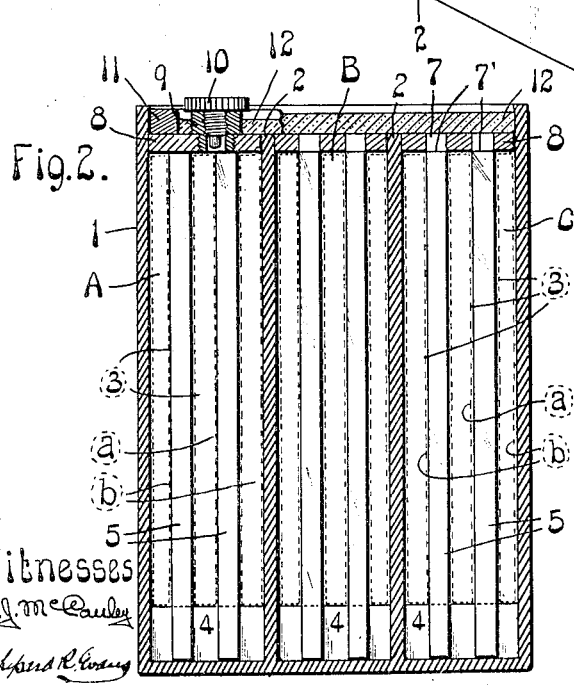
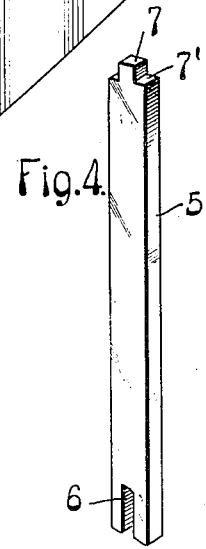
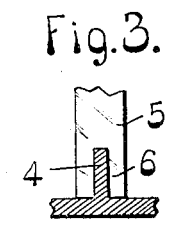
Witnesses
A. J. McCauley
Shepard R. Evans
Inventors
William Gardiner AND
John Stirlen
by Ralph Kalish Att'y.

UNITED STATES PATENT OFFICE.

JOHN STIRLEN AND WILLIAM GARDINER, OF ST. LOUIS, MISSOURI, ASSIGNORS, BY MESNE ASSIGNMENTS, TO MISSOURI ELECTRIC STORAGE BATTERY COMPANY, OF ST. LOUIS, MISSOURI, A CORPORATION OF MISSOURI.

STORAGE BATTERY.

No. 926,649.　　　Specification of Letters Patent.　　　Patented June 29, 1909.

Application filed February 11, 1909. Serial No. 477,422.

*To all whom it may concern:*

Be it known that we, JOHN STIRLEN and WILLIAM GARDINER, citizens of the United States, residing at the city of St. Louis, State of Missouri, have jointly invented a new and useful Improvement in Storage Batteries, of which the following is a specification, reference being had to the accompanying drawings, forming a part hereof, in which—

Figure 1 is a perspective view of our improved storage battery; Fig. 2 is a vertical sectional view thereof on the line 2—2, Fig. 1; Fig. 3 is a fragmentary sectional view illustrating one of the transverse supporting ribs or bridges in the bottom of the casing, showing also the lower end of one of the spacing bars; and Fig. 4 is a view of one of the spacing bars.

This invention relates to a new and useful improvement in storage batteries.

The object of our invention is to provide a storage battery which is strong and easily manufactured and in which the grids or plates are firmly supported in proper position above the bottom of the casing of the battery, whereby particles of the active material which may separate and fall from said grids or plates will drop to the bottom of the casing and short-circuiting is thereby avoided; in which the said grids or plates are prevented from bulging at their intermediate portions, thus obviating known defects in storage batteries now on the market; in which the covers for the several compartments of the casing in which the said grids or plates are contained are prevented from sagging at their centers; and in which, by the provision of suitable means, the electrolyte in one compartment or cell of the battery is prevented from overflowing into another compartment or cell of the battery or over the entire surface of the battery; and to improve generally upon batteries of the kind described.

With these objects in view, our invention consists in the novel construction of the several parts of our battery and in the novel arrangement and combination of the same, all as will hereinafter be described and pointed out in the claims.

In the drawings, 1 indicates the casing of the battery, which is preferably made of hard rubber and is preferably of rectangular shape, casing 1 being divided into compartments by partitions 2 preferably integral therewith. While it is to be understood that the casing 1 may be divided into any number of compartments by partitions 2, depending upon the size of casing 1, we have shown but two partitions 2, dividing casing 1 into compartments A, B, and C, in which compartments the grids or plates 3 and electrolyte are adapted to be received.

The grids or plates 3 may be of any approved construction and are shown in dotted lines in Fig. 2, as they form no part of this invention. In each compartment of the casing 1, as is usual, there are preferably three grids or plates, the positive grid *a* and a negative grid *b* on each side of said positive grid, the said grids of said several compartments being suitably electrically connected and the projecting positive and negative poles of the battery being indicated at *a'* and *b'*, respectively.

4 indicates a rib or bridge extending transversely across the bottom of each said compartment, there being preferably two such ribs or bridges in each said compartment. The said grids or plates 3 rest upon and are supported above the bottom of said compartments by said ribs or bridges 4. A space in each said compartment below said grids is thus provided, so that should any of the active material drop from said grids into said compartments, short-circuiting will not occur.

5 indicates what we term the spacing bars, each of said bars being bifurcated at one end, as at 6, and having a reduced portion 7 and shoulders 7' at its other end. Two of these bars 5, which are preferably of hard rubber or other insulation material, are arranged, as shown in Figs. 1 and 2, between each grid or plate 3 in each compartment and serve as spacers therebetween, for obvious purposes, and also prevent the said grids or plates bulging outwardly at their intermediate portions, at the same time the flow of the electrolyte not being impeded, the bifurcated end 6 of each bar 5 straddling and being firmly mounted upon said ribs or bridges 4 in the bottom of each said compartment. By this construction there is little liability of said grids or plates contacting with one another, thereby lengthening the life of the battery.

8 indicates covers or tops which are adapted to fit snugly in the tops of said compartments, the upper surface of said covers and tops of said partitions 2 being preferably below the level of the top of said casing 1 for purposes hereinafter appearing. Each of said covers 8 is provided with suitable openings into which fit the reduced ends 7 of said bars 5, said covers 8 being adapted to rest upon said shoulders 7' of said bars 5, whereby said covers are firmly supported in said compartments above said grids or plates 3 and are also prevented from sagging or bulging inwardly, at the same time said bars 5 also serving to support said grids or plates 3 in proper position in said compartments. Each of said covers 8 is provided with a screw-threaded opening which receives a threaded sleeve 9, which is adapted to be closed by a threaded plug 10, through which sleeves 9 the electrolyte or active fluid used in the battery is adapted to be placed in said compartments.

12 indicates a coating or layer of wax, or other suitable material by which the open or top side of said casing is adapted to be sealed, said wax, or other suitable material being placed over said covers 8 and around said sleeves 9 while soft and allowed to harden, see particularly Figs. 1 and 2.

11 indicates a frame, preferably of hard rubber or other suitable material, which is adapted to rest upon said sealing material 12 and surround said sleeve 9, the upper surface of said frame 11 being preferably flush with the top of the sides of said casing. A frame 11 is adapted to be placed around each sleeve 9 of each compartment, and the same are preferably placed in position while said sealing material 12 is soft, whereby said sealing material, in hardening, serves also to hold said frames in position. The said frames 11, as shown in Fig. 1, thus surrounding said sleeves 9, provide a basin or concavity around each thereof, whereby any of the electrolyte which might gas or boil up through the sleeve 9 of one compartment is prevented from overflowing into the other compartments of the casing or on to the surface upon which said casing is supported. This is a distinct advantage in our battery, for the electrolyte in the several respective compartments of said casing, which might be in said several respective compartments in different chemical conditions, or states of decomposition, is thus prevented from mixing.

By the above construction, we provide a storage battery which is strong and durable and which fully accomplishes the objects before stated.

We are aware that minor changes in the arrangement, construction, and combination of the several parts of our battery might be made and substituted for those herein shown and described without departing from the nature and spirit of our invention.

Having thus described our invention, what we claim and desire to secure by Letters Patent is:

1. A storage-battery comprising a box-shaped receptacle, a removable cover for one side of said receptacle, a plurality of transverse ribs in the bottom of said receptacle, battery-members in said receptacle resting on said ribs, and bars between said battery-members adapted to support the same in proper position in said receptacle and prevent said members bulging at their intermediate portions, one end of each of said bars being firmly mounted on the bottom of said receptacle; substantially as described.

2. In a storage battery, the combination with a casing provided with compartments, of a plurality of transverse ribs in the bottom of each of said compartments, battery-elements in each of said compartments resting on said ribs, spacing bars in each of said compartments between said battery-elements, one end of each of said spacing-bars being supported on said ribs, and a removable cover for each of said compartments adapted to be supported in position by said spacing-bars; substantially as described.

3. In a storage-battery, the combination with a casing provided with a plurality of compartments, of a plurality of transverse ribs in the bottom of each of said compartments, grids in each of said compartments resting on said ribs, spacing-bars in each compartment between said grids, each of said spacing-bars being bifurcated at one end and adapted to straddle and be supported on said ribs and being provided at the other end with a reduced portion 7 and shoulders 7', and a cover for each of said compartments adapted to receive the reduced ends of said spacing-bars in said compartment and be supported upon said shoulders; substantially as described.

4. In a storage-battery, the combination with a casing provided with a plurality of compartments, of a plurality of transverse ribs on the bottom of each of said compartments, battery-members in each of said compartments resting on said ribs, spacing bars firmly mounted in each of said compartments and extending between said grids, a cover for each of said compartments, each of said covers being provided with an opening into the interior of its compartment, and a frame mounted on each of said covers around said opening therein; substantially as described.

5. In a storage-battery, the combination with a casing provided with a plurality of compartments, of a plurality of transverse ribs in the bottom of each of said compartments, grids in each of said compartments resting on said ribs, a plurality of spacing-bars firmly mounted in each of said compartments between said grids, a cover for each of said compartments, each of said covers being provided with an opening into the interior of its compartment, a layer of sealing material extending between the sides of said casing over the non-perforated portions of said several covers, and a separate frame resting on said sealing material and surrounding each of said openings therein; substantially as described.

6. In a storage-battery, the combination with a casing provided with a plurality of compartments, of transverse ribs in the bottom of each of said compartments, a plurality of grids in each of said compartments resting on said ribs, a plurality of spacing-bars in each of said compartments between said grids, a cover for each of said compartments provided with an opening into the interior thereof, a hollow sleeve fitting in each of said openings, a layer of sealing material extending between the sides of said casing over said covers and around said sleeves, and a frame surrounding each of said sleeves and providing a basin therearound, said frames being embedded in and held in position by said sealing material; substantially as described.

7. In a storage-battery, the combination with a casing, of a plurality of transverse ribs in the bottom thereof, a plurality of grids in said casing resting on said ribs, a plurality of spacing bars in said casing between said grids, each of said spacing-bars being bifurcated at one end and adapted to straddle and be supported on one of said ribs and being provided at the other end with a reduced portion 7 and shoulders 7', and a cover for said casing adapted to receive the reduced ends of said spacing-bars and be supported upon said shoulders; substantially as described.

8. A storage-battery comprising a casing, a plurality of transverse ribs in the bottom of said casing, a plurality of grids in said casing resting on said ribs, a plurality of spacing-bars in said casing between said grids, a cover fitting in one side of said casing and provided with an opening into the interior thereof, a layer of sealing material extending between the sides of said casing over the non-perforated portion of said cover, and a frame surrounding said opening and providing a basin or concavity therearound, said frame being embedded in and held in position by said sealing material; substantially as described.

9. A storage-battery comprising a casing, a plurality of transverse ribs in the bottom of said casing, a plurality of grids in said casing resting on said ribs, a plurality of spacing-bars in said casing between said grids, each of said spacing bars being bifurcated at one end and adapted to straddle and be supported on one of said ribs and being provided at the other end with a reduced portion 7 and shoulders 7', a cover fitting in the open side of said casing and adapted to receive the reduced ends of said spacing-bars and be supported upon said shoulders, said cover being provided with an opening into the interior of said casing, a layer of sealing material extending between the sides of said casing over the non-perforated portion of said cover, and a frame on said seal and surrounding said opening and providing a basin or concavity therearound; substantially as described.

In testimony whereof, we have signed our names to this specification in the presence of two subscribing witnesses.

JOHN STIRLEN.
WILLIAM GARDINER.

Witnesses:
JOHN BOYLE,
SHEPARD R. EVANS.